UNITED STATES PATENT OFFICE.

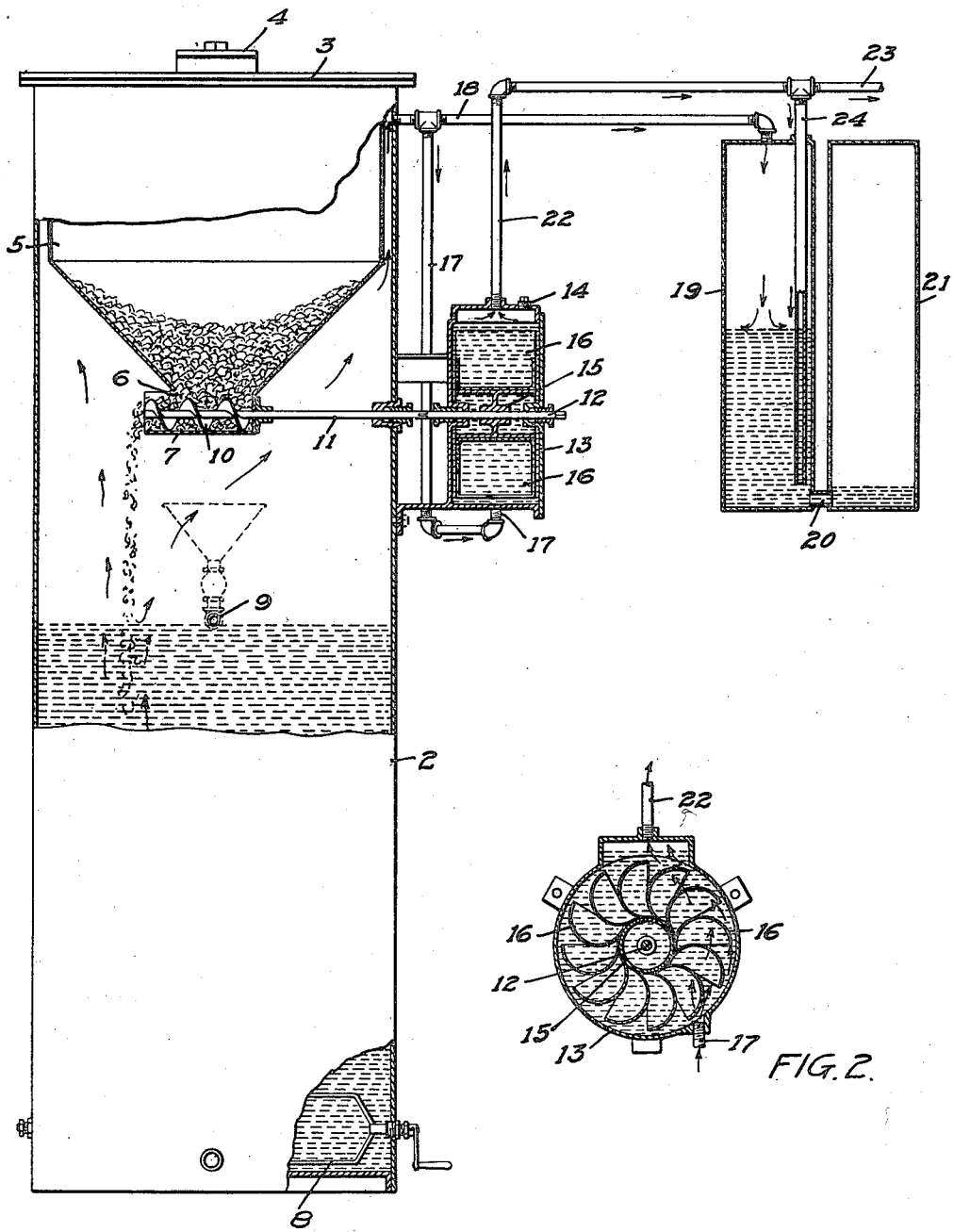

JOHN W. SMITH AND ELMER H. SMITH, OF MINNEAPOLIS, MINNESOTA, ASSIGNORS OF ONE-HALF TO VULCAN PROCESS COMPANY, OF MINNEAPOLIS, MINNESOTA, A CORPORATION.

ACETYLENE-GENERATOR.

1,175,568. Specification of Letters Patent. Patented Mar. 14, 1916.

Application filed December 16, 1912. Serial No. 736,938.

*To all whom it may concern:*

Be it known that we, JOHN W. SMITH and ELMER H. SMITH, citizens of the United States, and residents of Minneapolis, in the county of Hennepin, State of Minnesota, have invented certain new and useful Improvements in Acetylene-Generators, of which the following is a specification.

Our invention relates to generators for acetylene gas and the object of the invention is to provide means for positively feeding the carbid to the water tank and regulating the feed automatically by the pressure of the generated gas.

A further object is to provide a regulating means which will be extremely sensitive and accurate in operation and of simple but durable construction.

The invention consists generally in various constructions and combinations, all as hereinafter described and particularly pointed out in the claims.

In the accompanying drawings forming part of this specification, Figure 1 is a vertical sectional view through a generator and regulating device embodying our invention, Fig. 2 is a detail sectional view of the revolving wheel for operating the force feed.

In the drawing, 2 represents a suitable tank adapted to contain a supply of water and having a cover 3 provided with a carbid filling opening 4.

5 is a carbid hopper arranged in the top of the tank and having a discharge opening 6 beneath which is a feed plate 7. In the bottom of the tank is an agitating device 8 adapted to revolve and stir up the residuum of the carbid and 9 is a filling pipe provided in the wall of the tank for supplying water thereto.

For feeding the carbid positively we prefer to provide a screw 10 having a spindle or stem 11 which projects through the wall of the tank and is connected to a shaft 12 which is mounted in bearings in a casing 13 supported outside and near the walls of the tank. This casing may be of any suitable size and is adapted to contain a supply of water which may be inserted through the filling opening 14.

Mounted on the shaft 12 is a hub 15 carrying a series of cups or buckets 16 which are preferably semi-spherical in form and there may be any suitable number of them arranged around the periphery of the hub.

The lower walls of the casing 13 are connected by a pipe 17 with a pipe 18 which leads from the upper walls of the tank 2 above the level of the water therein. Through this pipe 18 the gas which accumulates in the top of the tank is allowed to flow. A tank 19 is located at a suitable distance from the generator tank and has its upper walls connected with the pipe 18 and this tank 19 is adapted to contain a supply of water and is connected by a nipple 20 with a similar tank 21. Both of these tanks are closed against the entrance or exit of air, and the water in the tank 19 will normally be held against flowing into the tank 21 by the air cushion in the upper portion of the tank 21, assuming that there is no increase above normal of the pressure in the tank 19 above the water line. A pipe 22 leads from the upper portion of the casing 13 and is connected to the service pipe 23 and also to a pipe 24 which extends down through the upper walls of the tank 19 and has its open lower end submerged in the water therein. Through this pipe 24 the gas must pass from the tank 19 to the service pipe.

In the operation of the generator, a crank will be applied to the outer end of the shaft 12 and the screw 10 revolved for the initial feed of the carbid. As the carbid falls into the water in the tank the gas generated will rise into the upper portion of the tank and flow through the pipes 18 and 17 into the casing 13 and the gas entering the cups 16 will force them through the water in the casing and revolve the shaft 12 to continue the positive feed of the carbid. This revolution of the wheel in the casing will be due to the fact that the gas entering through the lower wall of the casing and rising in the water therein will be confined by the walls of the cups and will exert a sufficient lifting force thereon to revolve the cups and continue the feed of the carbid. When a sufficient pressure has been generated in the upper portion of the water tank and has entered the tank 19, the water therein will be forced into the tank 21 until the open lower end of the pipe 24 is exposed to allow the gas to flow directly from the generator tank to the tank 19 and from thence to the service pipe 23. When the open end of the pipe 24 is exposed, a sufficient back pressure will be created through the pipe 22 to stop the wheel and this condition will continue as long as a pressure sufficient to expel the liquid from the tank 19 remains therein. As soon as the pressure falls in the tank 19 the water will flow back and the gas accumulating in the water tank and the casing 13 will begin the revolution of the wheel to resume the feed of the carbid. In this way an accurate balance is maintained at all times and the feed is positively regulated by the pressure of the gas. Evidently by varying the height of the column of water in the tank 19 the gas pressure may be varied to suit different conditions.

In various ways the details of construction may be modified and still be within the scope of our invention.

We claim as our invention:—

1. The combination, with an acetylene gas generator, of a pressure operated carbid feeding means having a pipe connection with said generator, a controlling device also having a pipe connection with said generator, a service pipe communicating with said feeding means and said controlling device, said carbid feeding means becoming inoperative and the gas flowing directly from said generator through said controlling device to said service pipe when the pressure of the gas in said controlling device is above a predetermined point, and indirectly through said feeding means to operate it when the pressure of the gas in said controlling device drops below a predetermined point.

2. The combination, with an acetylene gas generator, of a pressure operated carbid feeding means having a pipe connection with said generator, said carbid feeding means including a wheel having a series of peripheral cups, a controlling device also having a pipe connection with said generator, a service pipe communicating with said feeding means and said controlling device, said feeding means becoming inoperative and the gas flowing directly from said generator through said controlling device to said service pipe when the pressure of the gas in said controlling device is above a predetermined point, and indirectly through said feeding means to operate it when the pressure of the gas in said controlling device drops below a predetermined point.

3. The combination, with an acetylene gas generator, of a pressure operated carbid feeding means having a pipe connection with said generator, a controlling device also having a pipe connection with said generator, said feeding means including a casing and a wheel submerged in water therein, a pipe connection with said generator leading into the lower portion of said casing, a service pipe communicating with the upper portion of said casing above said wheel and with said controlling device, said carbid feeding means becoming inoperative and the gas flowing directly from said generator through said controlling device to said service pipe when the pressure of the gas in said controlling device is above a predetermined point and indirectly through said feeding means to operate it when the pressure of the gas in said controlling device drops below a predetermined point.

4. The combination, with a tank adapted to contain a supply of water and a carbid hopper therein, of a feeding means, a regulating tank having a pipe connection with said generator tank and adapted to contain a column of water, a service pipe having its open end normally submerged in said regulating tank, and means actuated by the force of the gas to operate said feeding means when the pressure in said regulating tank is insufficient to displace the column of water therein and expose said service pipe.

5. The combination, with a generator tank adapted to contain a supply of water and provided with a carbid hopper, of a regulating device comprising twin tanks having a communicating passage between their lower walls, one of said tanks being adapted to contain a column of water and having a pipe connection with said generator tank, and a service pipe having its open end submerged in said column of water, said water column being forced from one tank into the other when the pressure in said one tank is sufficient to lift said column against the air cushion in said other tank and expose said service pipe, and means having pipe connections with said service pipe and with said generator tank and actuated by the generated gas for feeding carbid from said hopper.

In witness whereof, we have hereunto set our hands this 12th day of December, 1912.

JOHN W. SMITH.
ELMER H. SMITH.

Witnesses:
GENEVIEVE E. SORENSEN,
EDWARD A. PAUL.